US007100147B2

(12) United States Patent
Miller et al.

(10) Patent No.: US 7,100,147 B2
(45) Date of Patent: Aug. 29, 2006

(54) METHOD, SYSTEM, AND PROGRAM FOR GENERATING A WORKFLOW

(75) Inventors: Wayne F. Miller, Cary, NC (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 09/894,074

(22) Filed: Jun. 28, 2001

(65) Prior Publication Data

US 2003/0004770 A1     Jan. 2, 2003

(51) Int. Cl.
*G06F 9/44* (2006.01)
(52) U.S. Cl. .......................... 717/102; 717/104; 705/8; 707/8; 715/700
(58) Field of Classification Search ........ 717/100–105, 717/109, 113, 120–123; 705/1, 7–9; 715/513, 715/700; 719/310, 320, 328; 707/8
See application file for complete search history.

(56) References Cited

U.S. PATENT DOCUMENTS

| 5,301,320 | A | 4/1994 | McAtee et al. ................ 705/9 |
| 5,535,322 | A | 7/1996 | Hecht ............................ 705/1 |
| 5,572,673 | A | 11/1996 | Shurts ........................ 712/200 |
| 5,596,744 | A | 1/1997 | Dao et al. ..................... 707/10 |
| 5,596,750 | A | 1/1997 | Li et al. |

(Continued)

FOREIGN PATENT DOCUMENTS

EP          982675          8/1999

(Continued)

OTHER PUBLICATIONS

Mohan, Workflow Management in the Internet Age, Aug. 1997, IBM Almaden Research Center.*

(Continued)

*Primary Examiner*—Antony Nguyen-Ba
(74) *Attorney, Agent, or Firm*—David W. Victor; Konrad, Raynes, & Victor LLP (57) ABSTRACT

Provided is a method, system, and program for generating a workflow. A plurality of graphical user interfaces (GUI) panels are displayed through which a user may define nodes of a workflow and associate at least one action and user with each node. During workflow execution of each node, the associated user performs the associated action. Further, multiple nodes define actions that process at least one object that is routed through multiple nodes of the workflow. A workflow model is generated from information entered into the GUI panels including the nodes and workflow defined by the user through the GUI panels that process the at least one object. The workflow model is transformed into a workflow definition language (WDL) file. The WDL file is then transferred to a workflow server, wherein the workflow server interacts with a database to implement the workflow model defined in the WDL file in the database. When executing the implementation of the workflow, a request by one user associated with one node is received to access the node when no other user is accessing the node. The user requesting access to the node is granted access to the node to perform the action associated with the node. The node is locked to prevent other users associated with the node from accessing the node. The lock on the node is released when the user granted access to the node completes the action associated with the node, wherein other users can access the node after the lock is released.

33 Claims, 7 Drawing Sheets

U.S. PATENT DOCUMENTS

| | | | |
|---|---|---|---|
| 5,634,053 A | 5/1997 | Noble et al. | 707/4 |
| 5,634,127 A | 5/1997 | Cloud et al. | 719/313 |
| 5,644,768 A | 7/1997 | Periwal et al. | |
| 5,721,912 A | 2/1998 | Stepczyk et al. | 707/102 |
| 5,721,913 A | 2/1998 | Ackroff et al. | 707/103 R |
| 5,734,837 A | 3/1998 | Flores et al. | 705/7 |
| 5,745,683 A | 4/1998 | Lee et al. | 709/250 |
| 5,745,687 A | 4/1998 | Randell | |
| 5,752,027 A | 5/1998 | Familiar | 707/103 R |
| 5,774,661 A | 6/1998 | Chatterjee et al. | 709/203 |
| 5,790,789 A | 8/1998 | Suarez | |
| 5,794,250 A | 8/1998 | Cariño, Jr. et al. | 707/9 |
| 5,826,086 A * | 10/1998 | Arima et al. | 717/105 |
| 5,826,239 A | 10/1998 | Du et al. | 705/8 |
| 5,860,066 A | 1/1999 | Rouse | 705/1 |
| 5,864,843 A | 1/1999 | Cariño, Jr. et al. | 707/4 |
| 5,873,083 A | 2/1999 | Jones et al. | 707/4 |
| 5,892,905 A | 4/1999 | Brandt et al. | |
| 5,913,214 A | 6/1999 | Madnick et al. | 707/10 |
| 5,926,636 A | 7/1999 | Lam et al. | 719/313 |
| 5,930,512 A | 7/1999 | Boden et al. | 717/102 |
| 5,937,388 A | 8/1999 | Davis et al. | 705/8 |
| 5,951,649 A | 9/1999 | Dobbins et al. | |
| 5,960,420 A | 9/1999 | Leymann et al. | |
| 5,987,422 A | 11/1999 | Buzsaki | 705/9 |
| 5,991,733 A | 11/1999 | Aleia et al. | |
| 6,006,193 A * | 12/1999 | Gibson et al. | 705/8 |
| 6,012,067 A | 1/2000 | Sarkar | 707/103 R |
| 6,044,378 A | 3/2000 | Gladney | 707/103 R |
| 6,061,667 A | 5/2000 | Danford-Klein et al. | |
| 6,065,009 A | 5/2000 | Leymann et al. | 707/10 |
| 6,073,109 A | 6/2000 | Flores et al. | 705/8 |
| 6,073,111 A | 6/2000 | Leymann et al. | 705/8 |
| 6,115,646 A | 9/2000 | Fiszman et al. | 700/181 |
| 6,151,583 A | 11/2000 | Ohmura et al. | |
| 6,170,002 B1 * | 1/2001 | Ouchi | 709/206 |
| 6,226,641 B1 * | 5/2001 | Hickson et al. | 707/8 |
| 6,278,977 B1 | 8/2001 | Agrawal et al. | |
| 6,308,163 B1 | 10/2001 | Du et al. | |
| 6,338,074 B1 | 1/2002 | Poindexter et al. | |
| 6,349,238 B1 | 2/2002 | Gabbita et al. | |
| 6,430,538 B1 | 8/2002 | Bacon et al. | |
| 6,453,320 B1 * | 9/2002 | Kukura et al. | 707/103 R |
| 6,487,607 B1 | 11/2002 | Wollrath et al. | |
| 6,578,006 B1 | 6/2003 | Saito et al. | |
| 6,606,740 B1 * | 8/2003 | Lynn et al. | 717/100 |
| 6,665,674 B1 | 12/2003 | Buchanan et al. | |
| 6,665,814 B1 | 12/2003 | Hobson et al. | |
| 6,681,243 B1 | 1/2004 | Putzolu et al. | |
| 6,691,299 B1 | 2/2004 | Hart et al. | |
| 6,721,713 B1 * | 4/2004 | Guheen et al. | 705/1 |
| 6,769,113 B1 | 7/2004 | Bloom et al. | |
| 6,769,124 B1 | 7/2004 | Schoening et al. | |
| 6,816,902 B1 | 11/2004 | Bandat et al. | |
| 6,853,974 B1 | 2/2005 | Akifuji et al. | |
| 6,877,153 B1 * | 4/2005 | Konnersman | 717/100 |
| 6,920,456 B1 | 7/2005 | Lee et al. | |
| 2002/0032783 A1 | 3/2002 | Tuatini | |
| 2002/0038357 A1 | 3/2002 | Haverstock et al. | |
| 2002/0040312 A1 * | 4/2002 | Dhar et al. | 705/8 |
| 2002/0059411 A1 | 5/2002 | Barnhouse et al. | |
| 2002/0103811 A1 | 8/2002 | Frankhuser et al. | |
| 2002/0120685 A1 | 8/2002 | Srivastave et al. | |
| 2002/0143949 A1 | 10/2002 | Rajarajan et al. | |
| 2003/0023472 A1 | 1/2003 | Lee et al. | |
| 2003/0023662 A1 | 1/2003 | Yaung | |
| 2003/0023728 A1 | 1/2003 | Yaung | |
| 2003/0023773 A1 | 1/2003 | Lee et al. | |
| 2003/0033415 A1 | 2/2003 | Graylin et al. | |
| 2003/0131075 A1 | 7/2003 | Bear et al. | |
| 2004/0015821 A1 * | 1/2004 | Lu et al. | 717/103 |

FOREIGN PATENT DOCUMENTS

| | | |
|---|---|---|
| JP | 10-081425 | 3/1998 |
| JP | 10-326314 | 12/1998 |
| JP | 11-003298 | 1/1999 |
| JP | 11-175644 | 7/1999 |
| JP | 11-249983 | 9/1999 |
| WO | 9963463 | 9/1999 |
| WO | 0014618 | 3/2000 |

OTHER PUBLICATIONS

Nyberg, Workflow Definition Languages, Nov. 2000, Tik-76.273 Seminar on Database Management.*

Leymannn-Roller, Workflow-based applications, 1997, IBM Systems Journal, vol. 36, No. 1.*

Reinwald-Mohan, Structured Workflow Management with Lotus Notes Release 4, Feb. 1996, Proc. 41th IEEE Computer society Int'l Conference (CompCon), digest of papers, pp. 451-457.*

Kelly trammel, Workflow Without Fear, Apr. 1996, Byte.com, http://www.byte.com/art/9604/sec8/art1.htm.*

U.S. Appl. No.# 09/894,413, filed on Jun. 28, 2001, entitled, "Method, System, and Program for Using Objects in Data Stores During Execution of a Workflow", invented by JJ Lin; WF Miller; and AT Yaung.

U.S. Appl. No.# 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 08, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3, undated.

IBM Corp. "Chapter 4, Introducing Enterprise Information Portal Workflow" from *Managing Enterprise Information Portal*, IBM Enterprise Information Portal for Multiplatforms, Version 7.1, #SC27-0875-00, Product Nos. 5697-G29 and 5697-G31, Aug. 2000, pp. iii-iv and pp. 39-45.

IBM, Corp. "Concepts and Architecture" IBM MQSeries Workflow, Version 3.3, #GH12-6285-03, Product No. 5697-FM3, Mar. 2001, pp. iii-58.

IBM, Corp. "User's Guide for the Work Management Builder" IBM ImagePlus Workfolder Application Facility for AS/400, Version 4 Release 1, #SC34-4587-00, Program No. 5733-A18, Sep. 1997, pp. iii-119.

Su, Syw et al. "An Extensible Knowledge Base Management System for Supporting Rule-based Interoperability among Heterogeneous Systems" 1995, ACM # 0-89791-812-6/95/11, pp. 1-10.

Johansson, Se et al. "Expert Workflow, Building Knowledge-Based Workflow Systems with Object Technology", 1997, pp. 45-49.

Leymann, F. et al. "Workflow-based Applications" [online], vol. 36, No. 1 —Application Development, pp. 1-22, plus 9 pages of linked Figures (drawings), and 2 pages of "Cited References and Notes", [Retrieved on May 17, 2001]. Retrieved from the Internet at <URL: http://www.research.ibm.com/journal/sj/361/leymann.html>.

Vossen, G. "The WASA2 Object-Oriented Workflow Management System", 1999, ACM # 1-58113-084-8/99/05, pp. 587-589.

Choudhury, G.S., C. Requardt, I. Fujinaga, T. Dilauro, E. W. Brown, J. W. Warner, and B. Harrington, "Digital Workflow Management: The Lester S. Levy Digitized Collection of Sheet Music", [online], @2000 *First Monday*, [Retrieved on Mar. 17, 2005], retrieved from the internet at <URL: http://firstmonday.org/issues/issue5_6/choundhury/index.html>.

Gulchu, C. (Ed.), "Suitable Interface Adaptor (Workflow Module)". *Cross-Organisational Workflow: CrossFlow,*, ESPRIT E/28635, Dec. 1999, pp. 1-12.

Hudgins, J. and L.A. Macklin, "New Materials, New Processes: Implementing Digital Imaging Projects into Existing Workflow", *Library Collections, Aquisitions & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processing Environment", *IBM Research Disclosure*, No. 430191, Feb. 2000, pp. 404-408.

IBM Corporation, "Runtime Transaction Management in a Transaction Service", *IBM Research Disclosure*, No. 416150, Dec. 1998, pp. 1720-1721.

Spitzer, T., "Forms, Workflow, and the Web", [online], [Retrieved on Mar. 17, 2005], retrieved from the internet at <URL: http://www.webtechniques.com/archives/199110/busi/>.

\* cited by examiner

METHOD, SYSTEM, AND PROGRAM FOR GENERATING A WORKFLOW

RELATED APPLICATIONS

This application is related to the following copending and commonly assigned patent filed on the same date herewith, which are incorporated herein by reference in their entirety:

"Method, System, and Program for Using Objects In Data Stores During Execution of a Workflow", having U.S. patent application Ser. No. 09/894,413; and "Method, System, and Program for Executing a Workflow", having U.S. patent application Ser. No. 09/894,076.

BACKGROUND OF THE INVENTION

1. Field of the Invention

The present invention relates to a method, system, and program for generating a workflow.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSERIES** workflow software product. A process modeler is a person that analyzes the business operations, determines how the information related to the operations is routed electronically to client computers, and then defines a workflow model of the operations. The workflow model may be coded in the FlowMark Definition Language (FDL). The workflow model is then imported into a Runtime program that verifies and translates the workflow model into a process template. An instance of the process template can then be invoked to automates the sequence of events defined by the model.

There is a continued need in the art to provide improved techniques for building and utilizing workflow models.

SUMMARY OF THE PREFERRED EMBODIMENTS

Provided is a method, system, and program for generating a workflow. A plurality of graphical user interfaces (GUI) panels are displayed through which a user may define nodes of a workflow and associate at least one action and user with each node. During workflow execution of each node, the associated user performs the associated action. Further, multiple nodes define actions that process at least one object that is routed through multiple nodes of the workflow. A workflow model is generated from information entered into the GUI panels including the nodes and workflow defined by the user through the GUI panels that process the at least one object. The workflow model is transformed into a workflow definition language (WDL) file. The WDL file is then transferred to a workflow server, wherein the workflow server interacts with a database to implement the workflow model defined in the WDL file in the database.

The workflow definition language (WDL) may comprise the FlowMark Definition Language (FDL).

In further implementations, the displayed GUI panel illustrates a layout of the workflow, including graphical representations of nodes and paths between the nodes. The user may manipulate instances of the graphical representations of the nodes and paths in the workflow within the GUI panel to design a layout of the nodes of the workflow.

In still further implementations, a request by one user associated with one node is received to access the node when no other user is accessing the node. The user requesting access to the node is granted access to the node to perform the action associated with the node. The node is locked to prevent other users associated with the node from accessing the node. The lock on the node is released when the user granted access to the node completes the action associated with the node, wherein other users can access the node after the lock is released.

Still further, the at least one object routed through the nodes for processing comprises at least one electronic document that is modified by users and routed through the nodes of the workflow.

Moreover, the object processed at the nodes is included in a work packet, wherein the work packet is capable of including multiple objects. Modifications to at least one object in the work packet is received by one user performing actions associated with one node, wherein multiple users perform actions at different nodes to process objects in the work packet routed through the nodes.

The described implementations provide a GUI builder to allow a user to generate a workflow that is automatically translated into a workflow definition language (WDL) for use by a workflow server. In this way, the workflow model generated by the GUI builder may be transformed and used with different vendor workflow engines that are compatible with the workflow definition language (WDL). Further, with the described implementations, the nodes may be designed to be document centric, in that the processing occurs with respect to work items assigned to each node.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
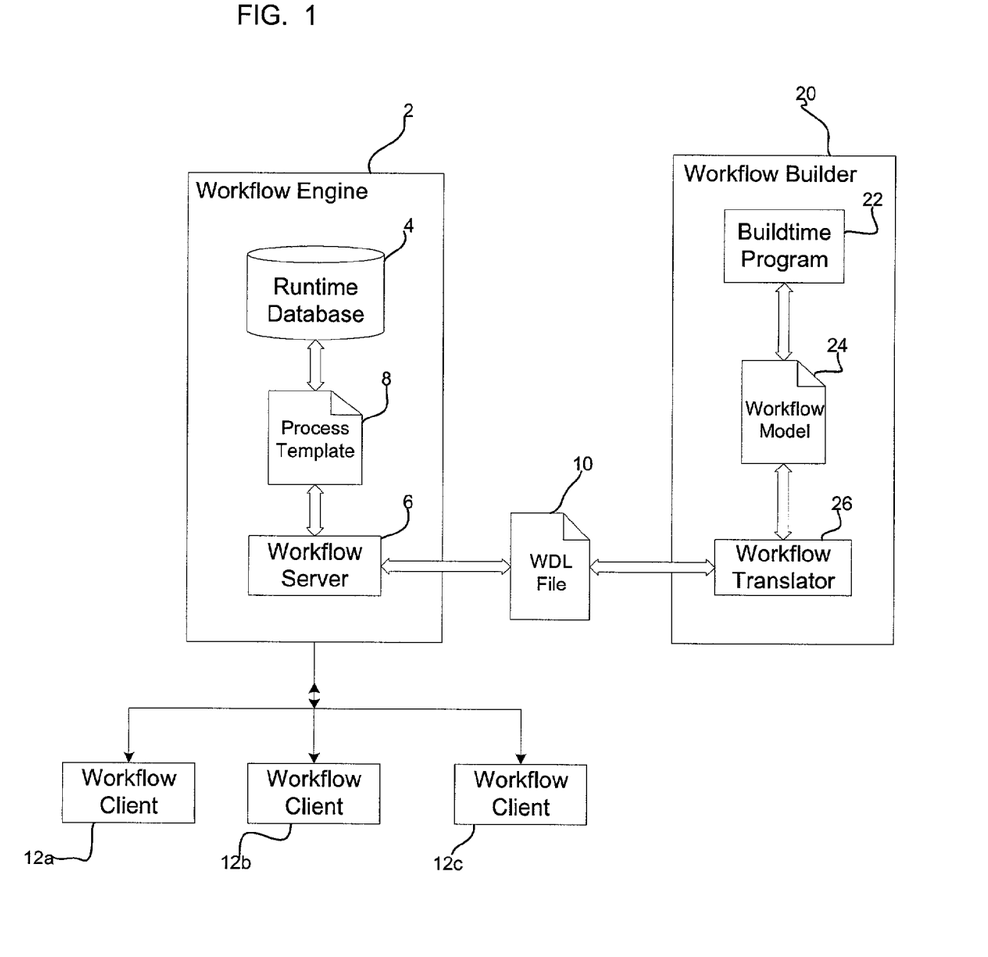
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

**MQSERIES, IBM, and DB2 are registered trademarks of International Business Machines Corp.

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve work load balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

As discussed, the buildtime program 22 generates a series of graphical user interface (GUI) panels through which the user may define a workflow. Before utilizing the buildtime program 22, the process modeler would plan the workflow and analyze the work the business performs, how it is performed, and by whom. The process modeler may then develop a workflow to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that workitem is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

Figure 2:
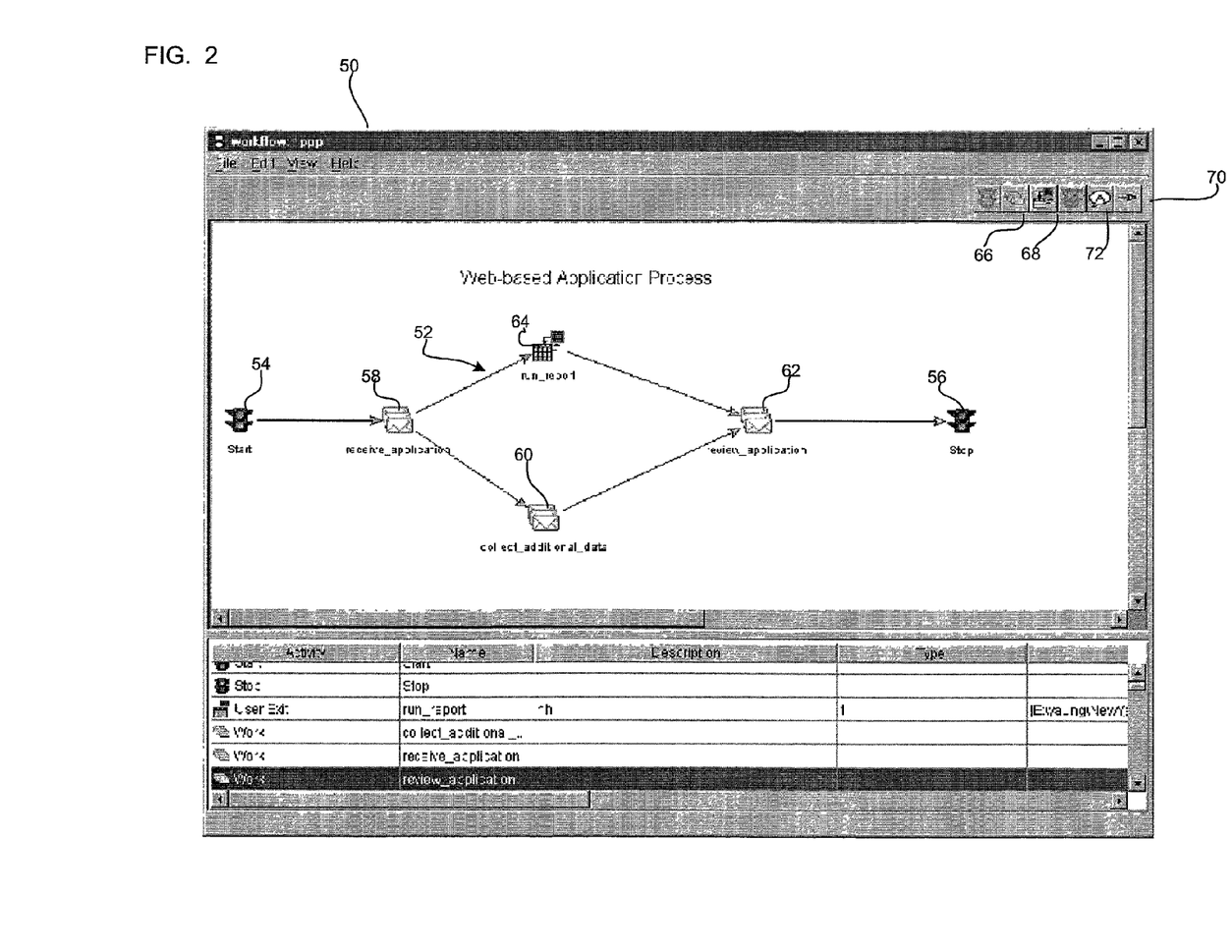
FIGS. 2–7 illustrate graphical user interface (GUI) panels used to design a workflow model in accordance with implementations of the invention.

FIG. 2 illustrates an example of a GUI panel 50 displayed by the buildtime program 22 illustrating a workflow 52 defined by a process modeler using workflow icons available in the GUI panel 50. The workflow 52 has a start icon 54, displayed as an icon having a green light, that indicates the start of the workflow and an end icon 56 is defined as indicating an end of the workflow. The start 54 and end 56 icons may be added automatically to the workflow 52 when the process modeler begins working on the workflow model 24. Between the start 54 and end 56 icons are a plurality of work nodes 58, 60, and 62, displayed as three stacked envelopes, that associate work items on the worklist and an action list for a specific point in a workflow 52. A work node 58, 60, 62 is a point in the workflow where work is performed. A user exit icon 64 indicates a user exit node where an application program is called to perform a background operation. Certain user exits may require that the called application program provide data to a work item in the workflow. Alternatively, the user exit may call an application program that may execute in the background, such as update a database, print reports, etc., while the workflow proceeds to further nodes.

As mentioned, the start 54 and end 56 icons may be automatically added to the workflow 52 when the user starts a blank workflow model 24. The user may move the start 54 and end 56 icons to any location on the drawing surface. The user may select the control icons 66 and 68 to add work and user exit nodes, respectively, to the workflow. Control icon 70 is used to define a path between two nodes defining the sequence in which the nodes are processed, and the order in which the work items are processed. The path lines, which are shown as the arrows between the start 54, end 56, work and user exit icons 58, 60, 62, and 64 illustrate the operation flow from one node to another.

Once the process modeler has defined the general layout of a workflow using the control icons 66, 68, 70, and 72, as shown in the workflow 52 in FIG. 2, the process modeler may then use additional GUI panels shown in FIGS. 3–7 of the buildtime program 22 to associate particular users, actions and work items with the nodes.

Figure 3:
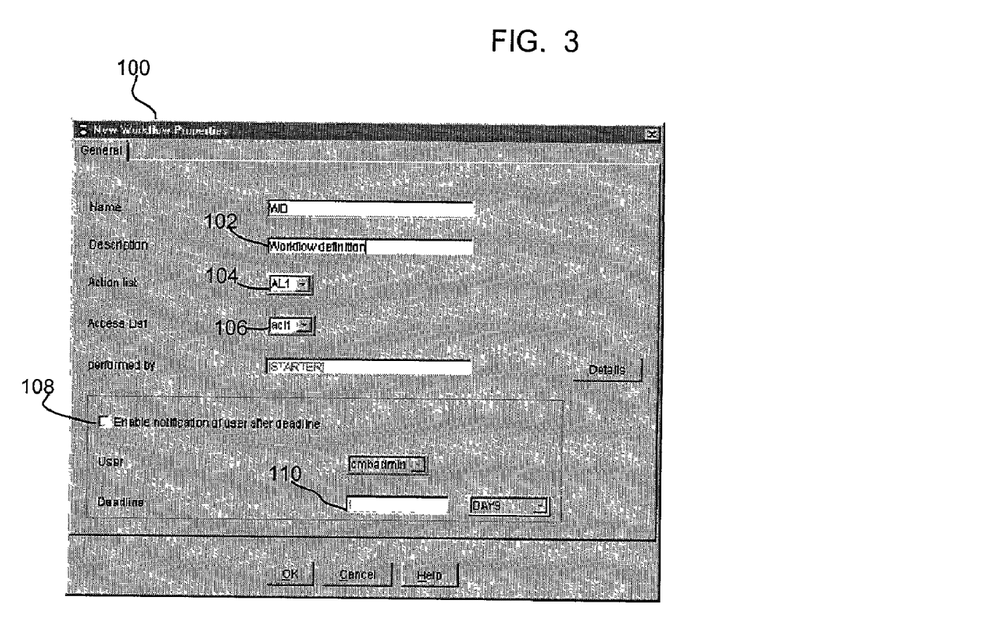

FIG. 3 illustrates a GUI panel 100 used to define properties for a new workflow being defined in the panel 50 of FIG. 1. A description field 102 includes a description of the workflow being defined. An action list 104 is a list the actions that can be invoked at the nodes in the defined workflow. The actions may comprise programs that are executed at a particular node. In certain implementations, the actions comprise Java methods that the workflow server 6 executes when control proceeds to the node with which the method is associated. The program modeler would associate the actions in the action list with particular nodes. An access list 106 defines a mapping of users that can be assigned to nodes to perform the action associated with such node. Selection of the enable notification checkbox 108 causes a message to be sent to a specified user if the user associated with a node has not performed the action defined for the node within a specified time frame indicated in the deadline field 110.

Figure 4:
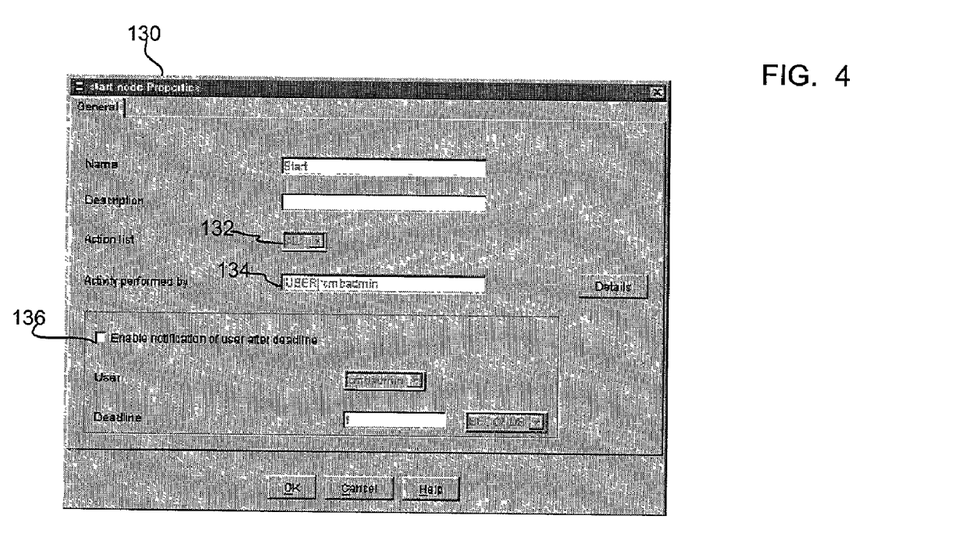

After defining the properties for the new workflow and placing icons in the drawing area and path arrows to define the workflow, the user would then use the GUI panels shown in FIGS. 4–7 to associate actions and a user with each node, where the associated user performs the associated action when the workflow server 6 processes the node according to the workflow. FIG. 4 illustrates a start node panel 130 in which the process modeler defines the action and user associated with the start node 54 in the workflow, i.e., the first user that will perform the action with respect to the item at the beginning of the workflow. The process modeler would select an action from the action list in the action field 132 and specify the user to perform the action at the start node in the user field 134. The enable notification of deadline checkbox 136 may be selected to notify the user associated with the start node that a deadline has passed during which the user designated action for that node was not completed. Anyone, such as an administrator, user associated with node, or other user on the access list may receive the notification of the missed deadline for the start node 54.

Figure 5:
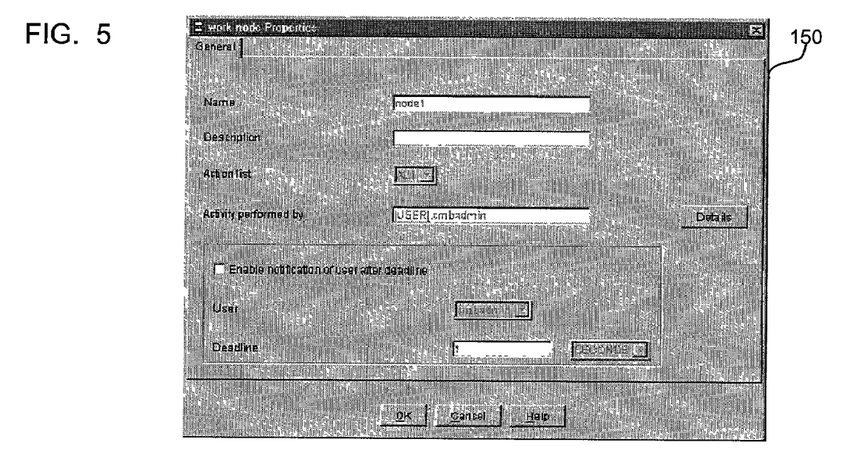

FIG. 5 illustrates the property GUI panel 150 used to associate one or more actions and a user with one of the work nodes in the workflow, such as work nodes 58, 60, and 62 in FIG. 2. The work nodes defined by the user may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 6:
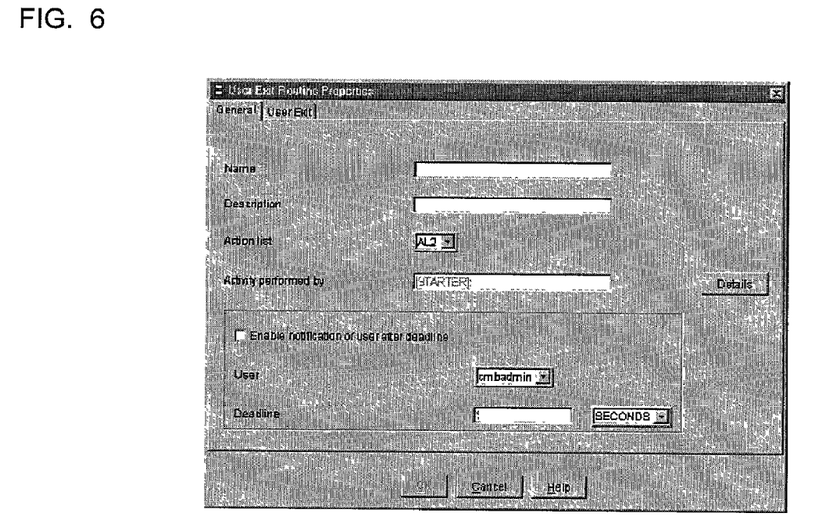
Figure 7:
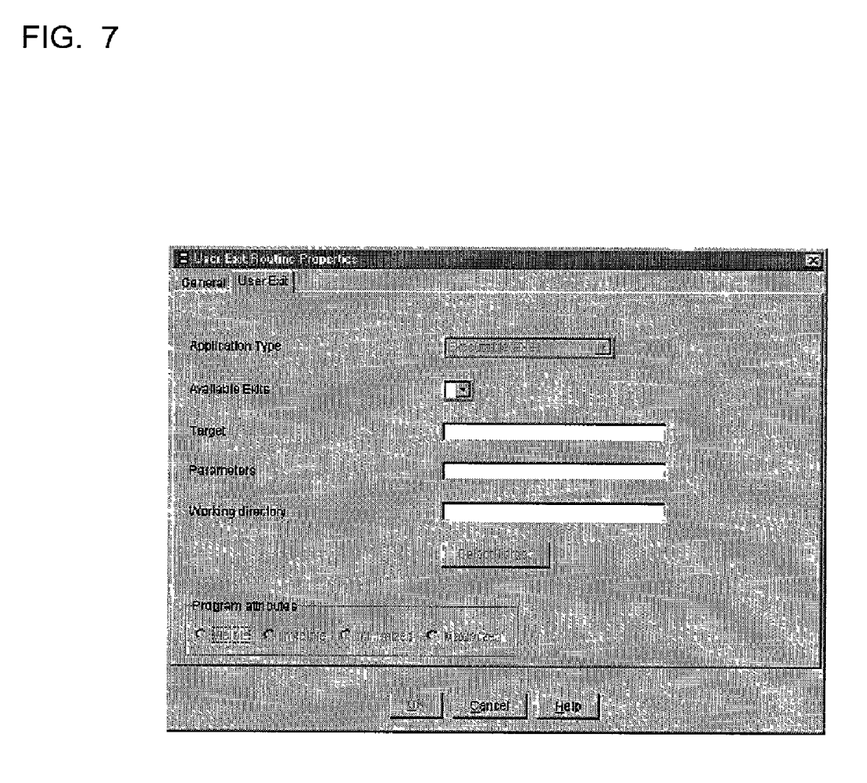

FIGS. 6 and 7 illustrates the property panels used to define a user exit node that calls an external application to perform operations and perhaps transfer data back to the node for further processing. A user exit is a point in the workflow execution where a user exit routine can be given control, and transfer data back and forth from the external application to the node upon the occurrence of a user-specified event. Further, the user exit node may call an external application program to perform background operations while the workflow proceeds to the next work node.

Using all the above described panels shown in FIGS. 2–7, the process modeler can design a workflow model specifying work nodes and the actions associated with the work nodes, as well as the paths between the work nodes. If two paths lead into a node, such as the case with work node 62 in FIG. 2, then the workflow will only proceed to the action specified for that next node once the actions associated with the two preceding nodes has completed. Before the user may use the buildtime program 22, the user must define the access control lists, users, user groups, actions, action lists and worklist in a manner known in the art using application programming interfaces (APIs). The worklist would provide those work items assigned to users, indicating the work items a user may access when performing actions at a node.

Figure 8:
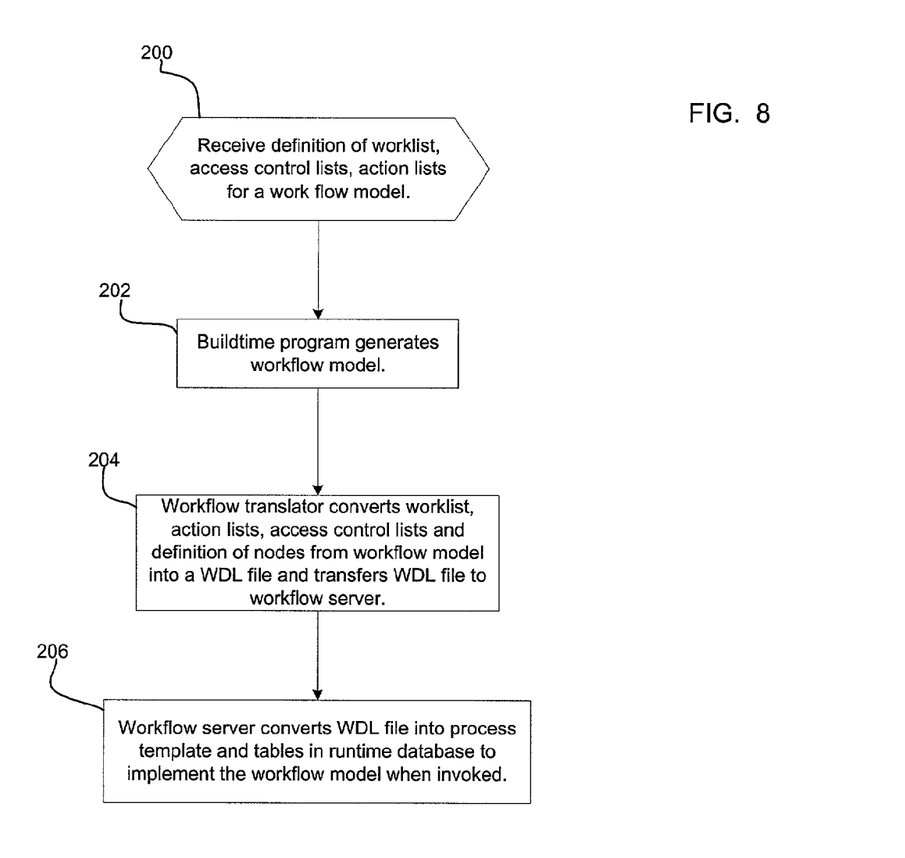
FIG. 8 illustrates logic implemented in a buildtime program to generate a workflow model and workflow definition language (WDL) file in accordance with implementations of the invention.

FIG. 8 illustrates logic implemented in the workflow builder 20 and workflow engine 2 to generate a workflow in the runtime database 4 that may be invoked and executed. Control begins at block 200 with the buildtime program 22 receiving defined work lists, access control lists, and action lists. The buildtime program 22 and GUI panels therein are then used to generate (at block 202) a workflow model 24 including a plurality of nodes, such as shown in FIG. 2, and paths therebetween defining the order of execution of the nodes in the workflow. At block 204, the workflow translator 26 converts the workflow model 24 and the defined workflow, access lists, action lists, etc. into a WDL file coded using a workflow definition language known in the art and transfers the WDL file 10 to the workflow server 6. The workflow server 6 then builds the process template 8, including tables and other data structures, in the runtime database 4 that are used to implement the workflow model defined using the buildtime program 22.

Figure 9:
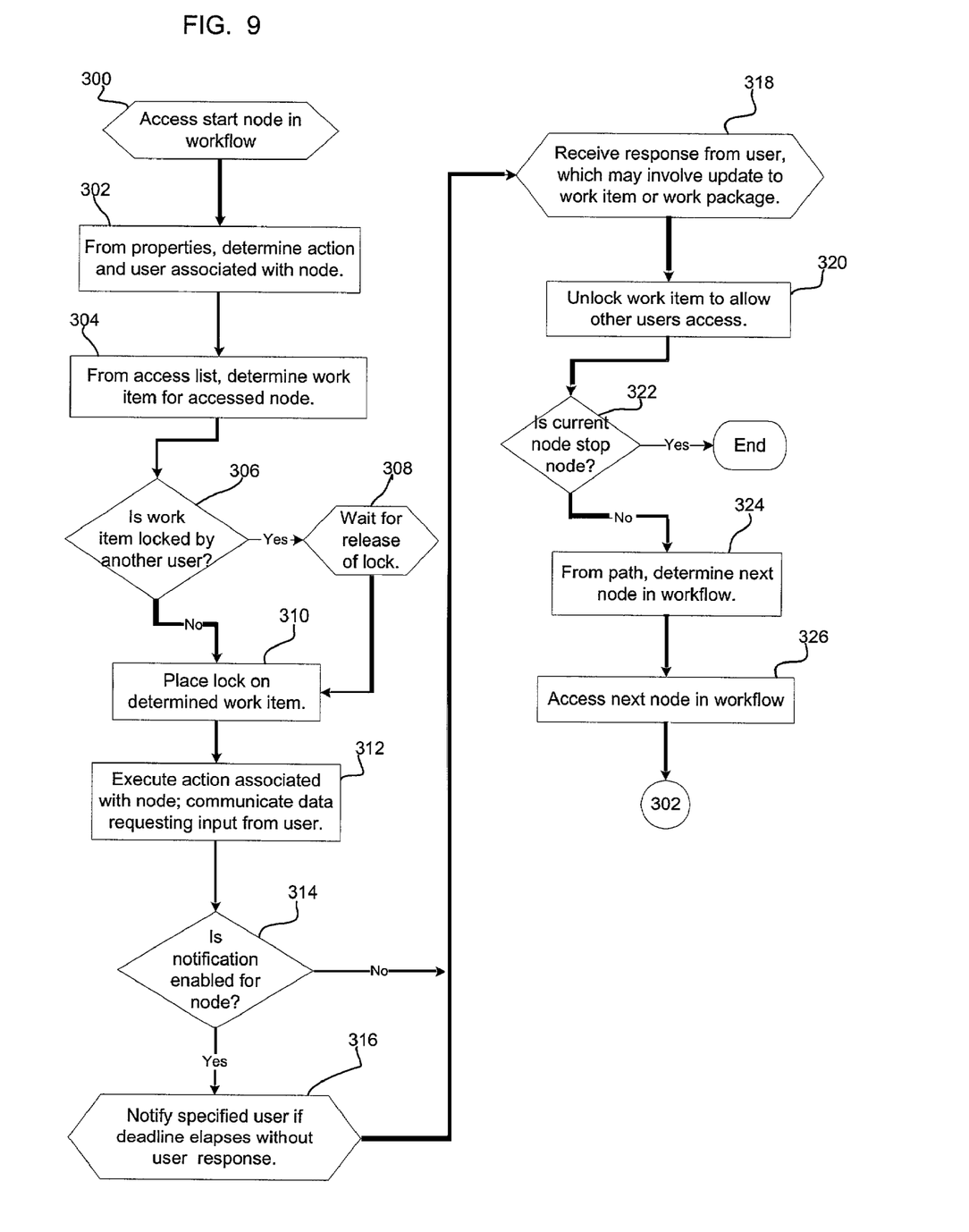
FIG. 9 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 9 illustrates the logic performed by the workflow server 6 to execute the workflow logic generated using the buildtime program 22 GUI panel 50 shown in FIG. 2. When a user invokes a workflow stored in the runtime database 4, the workflow server 6 accesses (at block 300) the start node of the invoked workflow by interacting with the runtime database 4 in a manner known in the art. From the properties defined for that node, the workflow server 6 determines (at block 302) the actions and user associated with the node. The workflow server 6 further processes (at block 304) the access list defined for the workflow to determine the work item for the accessed node. If (at block 306) the determined work item currently accessed in the workflow is locked by another user at that node, then the workflow server 6 waits (at block 308) for the lock on the work item(s) to be released. If the work item is not locked or after the lock is released, control proceeds to block 310 where the workflow server 6 places a lock on the determined work item. The workflow server 6 then executes (at block 312) the action associated with the node and communicates data to the workflow client 12 of the determined user requesting user action.

If (at block 314) notification is enabled for the current node and the deadline has passed (at block 316) without receiving a response from the user, then the workflow server 6 notifies the user specified with the enable notification that the deadline has passed. Upon receiving (at block 318) a response from the user, which may comprise entering information, modifying a work item, adding a work item to the work package, selecting an option, etc., the workflow server 6 unlocks (at block 320) the work item(s) previously locked for the user. If (at block 322) the current node is the stop node, then control ends; otherwise, if there are further nodes to process in the workflow, then the workflow server 6 determines (at block 324) from the path from the current node the next node in the workflow and accesses (at block 326) the next node. Control then proceeds back to block 326 to process the next node.

The workflow logic of FIG. 9 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow. The workflow builder 20 provides a GUI tool to allow the user to create a document centric workflow model and translate that workflow model 24, including the defined worklists, access lists, action lists, etc., into a workflow definition language (WDL) file 10 that can be maintained and utilized in a robust workflow engine software product known in the art.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, the actions were implemented as Java methods. Alternatively, the actions may be implemented in any programming language known in the art.

In the described implementations, particular icons were used to represent different information in the workflow, such as work nodes, exit nodes, etc. However, any icon design may be used to represent the workflow components. Further, additional graphical representations may be provided for different types of work nodes, e.g., collection work nodes, assign value node, decision point node, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a workflow, comprising:
displaying a plurality of graphical user interface (GUI) panels through which a user is capable of defining nodes of a workflow and associating at least one action and user with each node, wherein the defined associated user performs the associated action at the node when executing the workflow, and wherein multiple nodes define actions that process at least one object that is routed through multiple nodes of the workflow;
generating from information entered into the GUI panels a workflow model including the nodes and workflow defined by the user through the GUI panels that process the at least one object;
transferring the workflow model into a workflow definition language (WDL) file;
transferring the WDL file to a workflow server, wherein the workflow server interacts with a database to implement the workflow model defined in the WDL file in the database;
receiving a request by one user associated with one node, when executing the implementation of the workflow model, to access the node when no other user is accessing the node;
granting the user requesting access to the node access to the node to perform the action associated with the node;
locking the node to prevent other users associated with the node from accessing the node; and
releasing the lock on the node when the user granted access to the node completes the action associated with the node, wherein other users can access the node after the lock is released.

2. The method of claim 1, wherein one displayed GUI panel illustrates a layout of the workflow including graphical representations of nodes and paths between the nodes to enable the user to manipulate instances of the graphical representations of the nodes and paths in the work flow within the GUI panel to design a layout of the nodes of the workflow.

3. The method of claim 2, wherein at least one graphical representation represents a work node, wherein for each graphical representation of the work node added to the GUI panel, further comprising:
displaying a GUI panel including fields in which the user associates the at least one user and action with the work node.

4. The method of claim 2, wherein at least one graphical representation represents a user exit node, wherein for each graphical representation of the user exit node added to the GUI panel, further comprising:
displaying a GUI panel including fields in which the user associates at least one action to be performed in the background, wherein the workflow proceeds to the next node while the associated at least one background action is performed.

5. The method of claim 4, wherein the background action comprises a call to an application to perform an action with respect to the object.

6. The method of claim 1, wherein if multiple nodes lead to one node in the workflow, then the workflow server when executing one instance of the workflow only proceeds to the node to which multiple nodes connect when the multiple nodes complete processing.

7. The method of claim 1, wherein the at least one abject routed through the nodes for processing comprises at least one electronic document that is modified by users and routed through the nodes of the workflow.

8. The method of claim 1, wherein the object processed at the nodes is included in a work packet, wherein the work packet is capable of including multiple objects, further comprising:
receiving modifications to at least one object in the work packet by one user performing actions associated with one node, wherein multiple users perform actions at different nodes to process objects in the work packet routed through the nodes.

9. The method of claim 8, further comprising:
receiving at least one additional object to add to the work packet from at least one user performing actions from at least one node, wherein the work packet, including any added objects, is routed through the modes of the workflow.

10. The method of claim 8, wherein the objects in the work packet are capable of comprising documents, images, sound files, video files, and application data.

11. The method of claim 8, wherein multiple users at different nodes may concurrently process objects in the work packet.

12. A system for generating a workflow, comprising:
a database;
a workflow server capable of interacting with the database;
a computer readable medium in communication with the workflow server;
means for displaying a plurality of graphical user interface (GUI) panels through which a user is capable of defining nodes of a workflow and associating at least one action and user with each node, wherein the associated user performs the associated action at the node when executing the workflow, and wherein multiple nodes define actions that process at least one object that is routed through multiple nodes of the workflow;
means for generating from information entered into the GUI panels a workflow model into the computer readable medium including the nodes and workflow defined by the user through the GUI panels that process the at least one object;
means for transforming the workflow model into a workflow definition language (WDL) file in the computer readable medium;
means for transferring the WDL file from the computer readable storage medium to the workflow server, wherein the workflow server interacts with the database to implement the workflow model defined in the WDL file in the database;
means for receiving a request by one user associated with one node, when executing the implementation of the workflow model, to access the node when no other user is accessing the node;
means for granting the user requesting access to the node access to the node to perform the action associated with the node;
means for locking the node to prevent other users associated with the node from accessing the node; and
means for releasing the lock on the node when the user granted access to the node completes the action associated with the node, wherein other users can access the node after the lock is released.

13. The system of claim 12, wherein one displayed GUI panel illustrates a layout of the workflow including graphical representations of nodes and paths between the nodes to enable the user to manipulate instances of the graphical representations of the nodes and paths in the work flow within the GUI panel to design a layout of the nodes of the workflow.

14. The system of claim 13, wherein at least one graphical representation indicates a work node, further comprising:
   means for displaying a GUI panel including fields in which the user associates the at least one user and action with the work node for each graphical representation of the work node added to the GUI panel.

15. The system of claim 13, wherein at least one graphical representation indicates a user exit node, further comprising:
   means far displaying a GUI panel including fields in which the user associates at least one action to be performed in the background for each graphical representation of the user exit node added to the GUI panel, wherein the workflow proceeds to the next node while the associated at least one background action is performed.

16. The system of claim 15, wherein the background action comprises a call to an application to perform an action with respect to the object.

17. The system of claim 12, wherein if multiple nodes lead to one node in the workflow, then the workflow server when executing one instance of the workflow only proceeds to the node to which multiple nodes connect when the multiple nodes complete processing.

18. The system of claim 12, wherein the at least one object routed through the nodes for processing comprises at least one electronic document that is modified by users and routed through the nodes of the workflow.

19. The system of claim 12, wherein the object processed at the nodes is included in a work packet, wherein the work packet is capable of including multiple objects, further comprising:
   means for receiving modifications to at least one object in the work packet by one user performing actions associated with at least one node, wherein multiple users perform actions at different nodes to process objects in the work packet routed through the nodes.

20. The system of claim 19, further comprising:
   means for receiving at least one additional object to add to the work packet from at least one user performing actions from at least one node, wherein the work packet, including any added objects, is routed through the nodes of the workflow.

21. The system of claim 19, wherein the objects in the work packet are capable of comprising documents, images, sound files, video files, and application data.

22. The system of claim 19, wherein multiple users at different nodes may concurrently process objects in the work packet.

23. A computer readable storage medium including code for generating a workflow in communication with a database and workflow server, wherein the code is enabled to cause a processor to perform operations, the operations comprising:
   displaying a plurality of graphical user interfaces (GUI) panels through which a user is capable of defining nodes of a workflow and associating at least one action and user with each node, wherein the defined associated user performs the associated action at the node when executing the workflow, and wherein multiple nodes define actions that process at least one object that is routed through multiple nodes of the workflow;
   generating from information entered into the GUI panels a workflow model including the nodes and workflow defined by the user through the GUI panels that process the at least one object;
   transforming the workflow model into a workflow definition language (WDL) file;
   transferring the WDL file to the workflow server, wherein the workflow server interacts with the database to implement the workflow model defined in the WDL file in the database;
   receiving a request by one user associated with one node, when executing the implementation of the workflow model, to access the node when no other user is accessing the node;
   granting the user requesting access to the node access to the node to perform the action associated with the node;
   locking the node to prevent other users associated with the node from accessing the node; and
   releasing the lock on the node when the user granted access to the node completes the action associated with the node, wherein other users can access the node after the lock is released.

24. The computer readable storage medium of claim 23, wherein one displayed GUI panel illustrates a layout of the workflow including graphical representations of nodes and paths between the nodes to enable the user to manipulate instances of the graphical representations of the nodes and paths in the work flow within the GUI panel to design a layout of the nodes of the workflow.

25. The computer readable storage medium of claim 24, wherein at least one graphical representation represents a work node, wherein for each graphical representation of the work node added to the GUI panel, further comprising:
   displaying a GUI panel including fields in which the user associates the at least one user and action with the work node.

26. The computer readable storage medium of claim 24, wherein at least one graphical representation represents a user exit node, wherein for each graphical representation of the user exit node added to the GUI panel, further comprising:
   displaying a GUI panel including fields in which the user associates at least one action to be performed in the background, wherein the workflow proceeds to the next node while the associated at least one background action is performed.

27. The computer readable storage medium of claim 26, wherein the background action comprises a call to an application to perform an action with respect to the object.

28. The computer readable storage medium of claim 23, wherein if multiple nodes lead to one node in the workflow, then the workflow server when executing one instance of the workflow only proceeds to the node to which multiple nodes connect when the multiple nodes complete processing.

29. The computer readable storage medium of claim 23, wherein the at least one object routed through the nodes for processing comprises at least one electronic document that is modified by users and routed through the nodes of the workflow.

30. The computer readable storage medium of claim 23, wherein the object processed at the nodes is included in a work packet, wherein the work packet is capable of including multiple objects, further comprising:
   receiving modifications to at least one object in the work packet by one user performing actions associated with at least one node, wherein multiple users perform actions at different nodes to process objects in the work packet routed through the nodes.

31. The computer readable storage medium of claim 30, further comprising:

receiving at least one additional object to add to the work packet from at least one user performing actions from at least one node, wherein the work packet, including any added objects, is routed through the nodes of the workflow.

32. The computer readable storage medium of claim 30, wherein the objects in the work packet are capable of comprising documents, images, sound tiles, video files, and application data.

33. The computer readable storage medium of claim 30, wherein multiple users at different nodes may concurrently process objects in the work packet.

* * * * *

UNITED STATES PATENT AND TRADEMARK OFFICE
CERTIFICATE OF CORRECTION

| | | |
|---|---|---|
| PATENT NO. | : 7,100,147 B2 | Page 1 of 1 |
| APPLICATION NO. | : 09/894074 | |
| DATED | : August 29, 2006 | |
| INVENTOR(S) | : Wayne F. Miller and Alan Tsu-I Yaung | |

It is certified that error appears in the above-identified patent and that said Letters Patent is hereby corrected as shown below:

<u>Column 9</u>, line 17 Claim 1, delete "transferring" and insert -- transforming -- .
Line 66, delete "one abject" and insert -- one object -- .

<u>Column 10</u>, line 16 Claim, delete "the modes of" and insert -- the nodes of -- .
Line 28, delete "readable medium" and insert -- readable storage medium -- .

<u>Colum 11</u>, line 13 Claim 15, delete "means far" and insert -- means for -- .

<u>Column 14</u>, line 3 Claim 32, delete "sound tiles" and insert -- sound files -- .

Signed and Sealed this

First Day of May, 2007

JON W. DUDAS
*Director of the United States Patent and Trademark Office*